CONDITION SENSING SYSTEMS AND CIRCUITS THEREFOR

Filed March 26, 1962 2 Sheets-Sheet 1

INVENTOR
JOHN M. HENNESS
BY [signature]
ATTORNEY

INVENTOR
JOHN M. HENNESS
BY Grover G. Foster
ATTORNEY 3,217,175

CONDITION SENSING SYSTEMS AND CIRCUITS THEREFOR

John M. Henness, Davenport, Iowa, assignor to The Bendix Corporation, Davenport, Iowa, a corporation of Delaware Filed Mar. 26, 1962, Ser. No. 182,432
3 Claims. (Cl. 307—88.5)

This invention relates to improvements in condition sensing systems and to improved electrical circuits applicable to such systems.

An object of the invention is to provide improved condition sensing systems.

Another object is to provide improved amplifying and voltage folding circuits which, while independently useful, are especially advantageously employed in condition sensing systems made according to the invention.

Other objects and advantages of the invention will hereinafter appear in the description of the invention and the embodiments shown in the accompanying drawings. It is to be understood that various modifications of the embodiments shown and other embodiments of the invention are possible without departing from the spirit of the invention and the scope of the appended claims.

Figure 1:
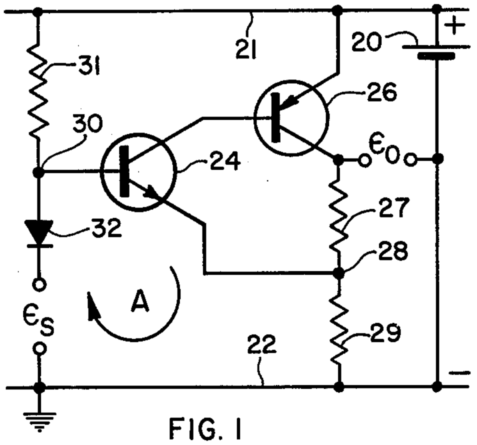
FIG. 1 shows the circuit diagram of an amplifier embodying the invention.
Figure 2:
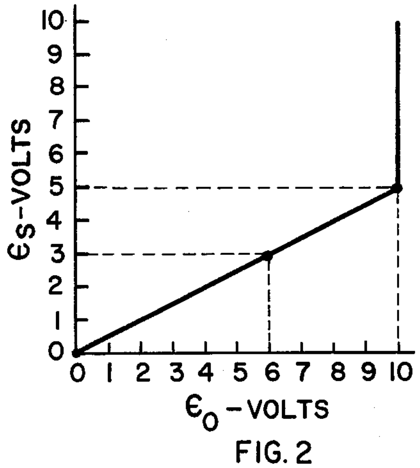
FIG. 2 is a graph illustrating the operation of the amplifier of FIG. 1.

*FIGURES 1 and 2*

The amplifier circuit of FIG. 1 includes a unidirectional power source 20 connected at its positive terminal to a positive line 21 and, at its negative terminal, to a negative ground line 22. It includes an NPN transistor 24 and a PNP transistor 26. The latter has its emitter connected to positive line 21 and its collector connected through a resistor 27, a junction point 28 and a resistor 29 to ground. The base of transistor 26 is connected to the collector of transistor 24. The latter's collector is connected to point 28 and its base is connected to a junction point 30 in a series circuit extending from positive line 21 through bias resistor 31, point 30, a diode 32, the positive terminal of a D.C. signal source, E*s*, and the negative terminal of the E*s* source to ground line 22.

For the purpose of an analysis of FIG. 1 operation, it will be assumed that supply 20 is a ten volt source, that the ratio of resistance of resistor 27 to resistor 29 is one to one, and that the transistors have an average value of current gain and specifically that this gain is 50. The signal voltage E*s* will be varied from 0 to 5 volts plus at point 30 at the base of transistor 24. The E*s* source is assumed to provide a D.C. current path for current flowing through resistor 31 and diode 32 whereby the diode voltage drop (because of the polarity direction of its connection) is in a direction aiding the signal, E*s*. Inclusion of the diode 32 is important because it is polarized to present to very high impedance to the generator E*s*. It will be shown that the output impedance of the amplifier is very low. In this respect the circuit has the advantages of a cathode follower, but it will be shown that the circuit can also provide a voltage gain. Thus inclusion of the diode is advantageous but its operation having been explained, it will simplify understanding of the circuit to omit from further consideration its voltage drop, which is small and substantially constant, as well as the voltage drop across the base to emitter junction of transistor 24, it too being small and substantially constant.

Having made these assumptions, if E*s* is zero, then the voltage at point 28 is zero relative to ground. By Kirchoff's voltage law applied to loop A, the voltage across resistor 29 must equal E*s* which equals zero. Thus the current in resistor 29 must be zero and accordingly the current in resistor 27 must be zero. Then when E*s* equals zero, the output voltage E*o* measured relative to ground at the collector of transistor 26 is zero and this point is plotted in the graph of FIG. 2.

Next suppose that the signal voltage E*s* in FIG. 1 is increased to three volts. The base to emitter junction of transistor 24 is forward biased and current flows from the transistor's collector to its emitter. This current flows from the base of transistor 26 and is very small. However, as an incident to this current flow, transistor 26 is rendered conductive and current flows through transistor 26 and resistors 27 and 29 to ground. Accordingly, a positive voltage appears at point 28 and transistor 26 current will increase until point 28 is at plus 3 volts. This valve corresponds to E*s* three volts whereby Kirchoff's law is satisfied in loop A. The gain of transistor being 50, 98% of the current in resistor 27 flows through transistor 26.

Neglecting the transistor 24 current which accounts for only 2% of this current flow, the current in resistors 27 and 29 can be considered to be equal. The resistance value of resistor 27 being equal to that of resistor 29, E*o* equals twice the voltage at point 28. Thus when E*s* equals 3 volts, E*o* equals 6 volts and this point is plotted in FIG. 2.

Similarly, when E*s* is increased to 5 volts, the voltage at point 28 is increased to 5 volts and E*o* is increased to ten volts. This point is also plotted on FIG. 2.

The voltage gain of the circuit is the ratio of the resistances of resistors 27 and 29 over the resistance of resistor 29. Operation of the circuit as an amplifier is thus defined. That the output impedance is very low is demonstrated by the fact that current through transistor 26 increases until the voltage at point 28 equals E*s* and it will do so even when a resistor of very low value is connected across resistors 27 and 29.

The source 20 impresses 10 volts on the circuit, so when E*s* is 5 volts and E*o* is 10 volts, the emitter to collector voltage drop in transistor 26 has diminished to zero. A further increase, about 5 volts, in the signal voltage E*s* effectively forward biases the emitter to base junction of the PNP transistor 26 with the result that the emitter to collector current decreases and the emitter to base current increases. Increase in the latter means that the collector to emitter current in the NPN transistor 24 is increased. Thus the current in resistor 27 decreases and that in resistor 29 increases. At a signal voltage of 7 volts, the voltage at point 39 increases to plus 7 volts and the drop across resistor 27 decreases to three volts. At a signal voltage of 10 volts, the voltage at point 39 increases to 10 volts whereas the voltage drop across resistor 27 is reduced to zero volts. The voltage across resistor 27, after having increased from zero to five volts, as the signal voltage was increased from zero to five, decreases from five to zero as the signal voltage increases from 5 to 10. The voltage across resistor 27 is said to have been "folded."

Figure 3:
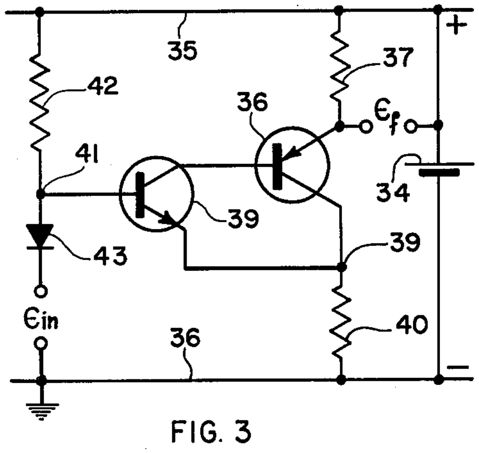
FIG. 3 shows the circuit diagram of a form of the amplifier of FIG. 1 modified to provide a folded output signal.

A more practical folding circuit having improved output impedance characteristics in the folded voltage range is shown in FIG. 3.

Figure 4:
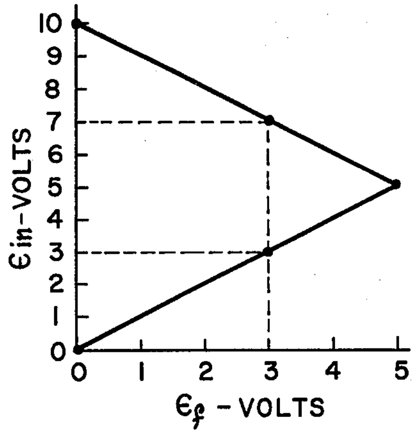
FIG. 4 is a graph illustrating the operation of the circuit of FIG. 3.

*FIGURES 3 and 4*

FIGURE 3 is identical in configuration to FIG. 1 except as follows. Resistor 27 has been removed from the connection between the junction point 28 and transistor collector and placed in the connection from the positive line to the transistor emitter. Further, the output voltage terminals appear across the resistor in its new location.

In the interests of clarity the elements have been renumbered in FIG. 3. They comprise a unidirectional source 34 connected by its positive and negative terminals to positive line 35 and negative ground line 35, respectively. The PNP transistor 36 is connected by its emitter to positive line 35 through resistor 37, by its base to the collector of NPN transistor 38, and by its collector to junction point 39 and resistor 40 to ground line 36. Transistor 38 has its emitter connected to point 39 and its base connected to junction point 41 in a series circuit extending from positive line 35 through bias resistor 42, point 41, a back-biased diode 43, the positive terminal of a signal source E*in*, and the negative E*in* terminal to ground line 36.

Initially, all the current flowing through transistor 36 in FIG. 3 flows through resistors 37 and 40 just as all the current flowing in transistor 26 flows through resistors 27 and 29 in FIG. 1. The corresponding elements of FIGS. 1 and 3 will be assumed to have the same value. Thus resistors 37 and 40 have equal resistance and source 34 impresses 10 volts on the circuit. The same simplifying assumptions have been made whereby it will be obvious that operation of the circuits of FIGS. 1 and 3 is the same for signal voltage values from zero to 5 volts except that the output voltage E*f* of FIG. 3, being taken across only one of the resistances, has half the value of E*o* for any input signal voltage magnitude from 0 to 5 volts. Thus, in FIG. 4, when E*in* equals 0, 3, and 5, E*f* equals 0, 3, and 5, respectively.

However, these circuits necessarily operate somewhat differently at signal input voltages above 5 volts. In FIG. 1, part of the current in transistor 26 flows through its emitter to base junction and subsequently through transistor 24 and resistor 29 and thus bypasses resistor 27. In FIG. 3 all of the current flowing through transistor 36 must flow through resistor 37. If the voltage across resistor 40 is to increase above 5 volts the voltage across resistor 37 must decrease below 5 volts and so the total current through transistor 36 must decrease. The increased current accounting for the rise above 5 volts at point 39, flows through the bias resistor 42 and the base-to-emitter junction of transistor 39.

Except for this difference, operation of the two circuits is analogous. When signal voltage E*in* is increased to seven volts the current through resistor 40 must increase so that the potential at point 39 is plus 7. Then the drop across resistor 37 must decrease to 3 volts which means that three sevenths of the current in resistor 40 flows through resistor 37 and the remainder flows through the base to emitter junction of transistor 39. When E*in* equals 10 volts none of the current flows through resistor 37. These points are plotted on the graph of FIG. 4.

Figure 6:
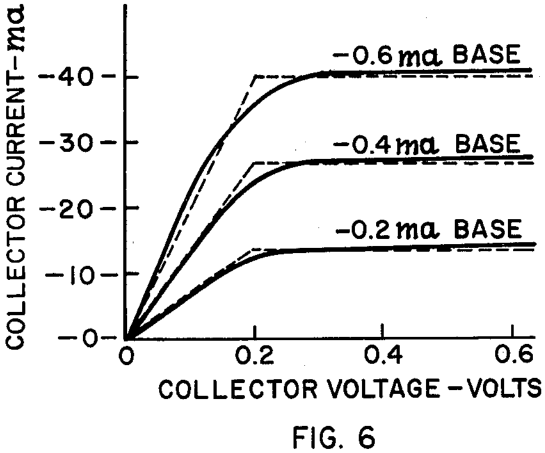
FIG. 6 is a graph showing the characteristics of transistors employed in the circuit of FIG. 5.
Figure 5:
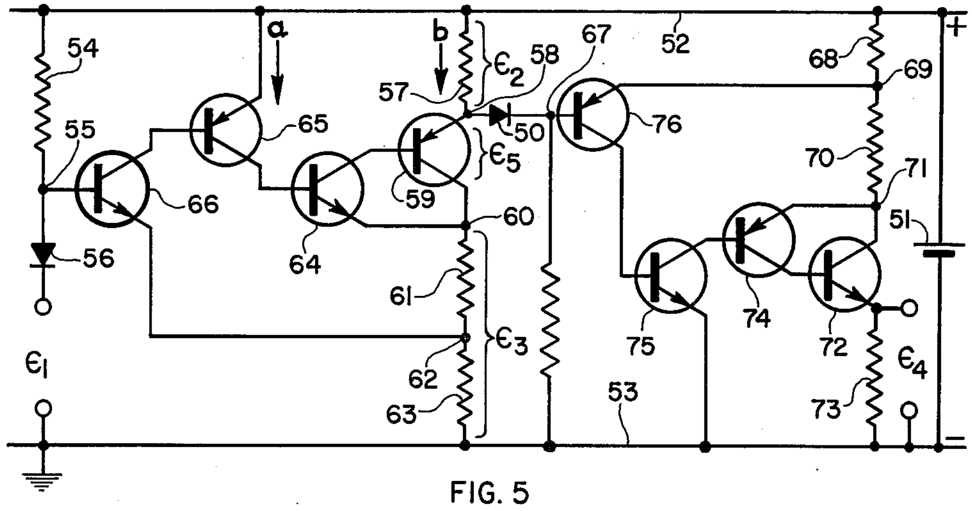
FIG. 5 is a circuit diagram of an amplifying folded output signal unit embodying the invention.

*FIGURES 5 and 6*

The NPN and PNP transistors in the circuits of FIGS. 1 and 3 can be replaced by PNP and NPN transistors, respectively, if the polarity of the input signal and supply source is reversed. This is illustrated in FIG. 5 in that portion of the circuit at the left, in the drawing, of the diode 50. FIG. 5 includes two "folding" stages one to the right and one to the left of diode 50. Each network includes an amplifier, like the amplifier of FIG. 1, and a "folder" like the one shown in FIG. 3.

The circuit includes a source 51 connected across positive line, or terminal point, 52 and negative ground line, or terminal point, 53. The first stage input circuit extends from line 52 through the series combination of a resistor 54, terminal point 55, diode 56, the positive and then the negative terminal of a signal source E, and finally ground line 53. The output circuit of this stage begins at positive line 52 and extends through a resistor 57, a junction point 58, and emitter to collector of a PNP transistor 59, junction point 60, resistor 61, junction point 62, and resistor 63 to ground line 53. The base of transistor 59 is connected to the collector of an NPN transistor 64 whose emitter is connected to point 60 and whose base is connected to the collector of another PNP transistor 65 whose emitter is connected to positive line 52 and whose base is connected to the collector of another NPN transistor 66. The latter has its emitter connected to point 62 and its base connected to point 55.

Diode 50 is connected between point 58 and a junction point 67 in the second stage input circuit which is completed by a connection from point 67 to ground line 53. The output circuit of the second stage extends from positive line 52 through a resistor 68, junction point 69, resistor 70, junction point 71, the collector to emitter circuit of an NPN transistor 72, and a resistor 73 to ground line 53. The base of transistor 72 is connected to the collector of a PNP transistor 74 whose base is connected to the collector of an NPN transistor 75 whose emitter is connected to ground line 53 and whose base connects to the collector of PNP transistor 76 having its base connected to point 67 and its emitter connected to point 69.

Again to facilitate comparison of FIG. 5 with FIGS. 1 and 3, the source 51 voltage will be assumed to be 10 volts. The resistance of resistor 57 will be assumed to be R and R will be assumed equal to the combined resistance of resistors 61 and 63, each of which has the value R over 2. The voltage $E_2$ across resistor 57 results from the resistor current, $b$. The voltage $E_3$ across resistors 61 and 63 results from the sum of $b$ and a current, $a$, which is all the current flowing in transistor 65 just as $b$ is all the current flowing in transistor 57. All the transistors are alike and have a current gain of B. Current $a$ in transistor 65 results in current B$a$ in transistor 64 which in turn results in current $xB^2a$ in transistor 59 where $x$ is a factor representing the extent to which full current gain is realized in transistor 59.

To illustrate the elevation of $x$, assume that all the transistors are silicon type 2N995. The collector characteristics for this device are shown in FIG. 6 which for the purpose of analysis are assumed to have the idealized form depicted by the dashed lines. The slope of the characteristic then changes abruptly to zero at a collector-to-emitter voltage, $E_5$ in FIG. 5, of −0.2 volt for each value of base current.

In a case I, when $E_5$ exceeds 0.2 volt, the full current gain B is realized and $x=1$ in the relation $$b=xB^2a \qquad (1)$$

The separation of the characteristics being equal at 0.2 collector volt for equal increments of base current, and all of the curves originating at the origin, it is obvious that the slope of gain plotted against $E_5$ for values of $E_5$ less than 0.2 volt is 5. Thus in case II, when $0<E_5<0.2$ $$x=5E_5 \qquad (2)$$

Neglecting the voltage drop across diode 56 we can write, on the basis of the descriptions in FIGS. 1 and 3:

$$E_3=2E_1 \qquad (3)$$

By observation from FIG. 5:

$$E_3=(a+b)R \qquad (4)$$

$$E_2=bR \qquad (5)$$

If V is the source voltage, and neglecting the base to emitter voltage drops in transistors 64 and 65:

$$E_5=V-E_2-E_3 \qquad (6)$$

Substituting (1) in (4):

$$E_3=(a+xB^2a)R \qquad (7)$$

or $$a=E_3/R(1+xB^2) \qquad (8)$$

Substituting (8) in (5):

$$E_2=(xB^2E_3)/(1+xB^2)$$

or $$E_2=(xE_3)/((1/B^2)+x) \qquad (9)$$

In case I ($x=1$) or ($E_5>$ 0.2 volt) therefore (9) is written $E_2=E_3/((1/B^2)+1)$ when $x=1$. But $1>>1/B^2$. Then:

$$E_2\cong E_3 \qquad (10)$$

Equation (6) may be written as follows for case I:

$$V-E_2-E_3>0.2$$

and in view of (10)

$$V-2E_2>0.2$$

This may be rewritten:

$$2E_2<V-0.2 \qquad (11)$$

Substituting (10) in (3) and the result in (11):

$$E_1<(V-0.2)/4 \qquad (12)$$

Thus as a solution to case I:

if:

$$E_1<(V-0.2)/4$$

then:

$$E_3=2E_1$$

Case II is $$E_1\geq(V-0.2)/4$$

Inserting (2) and (6) in (9):

$$E_2=B^2E_3 5(V-E_2-E_3)/(1+5B^2(V-E_2-E_3)) \qquad (13)$$

After manipulation to quadratic form:

$$E_2^2-E_2(V+1/5B^2)+E_3(V-E_3)=0 \qquad (14)$$

Since $V>>1/5B^2$, (14) may be written:

$$E_2^2-E_2V+E_3(V-E_3)=0$$

Solving:

$$E_2=(2V\pm\sqrt{V_2-4E_3V+4E_3^2})/2$$

by the quadratic formula results in the two roots:

$$E_2=E_3$$

which does not satisfy case II, and $$E_2=V-E_3 \qquad (15)$$

which does.

Substituting (3) in (15): $E_2=V-2E_1$ in case II. (16)

Summarizing:

$$E_2=2E_1 \text{ if } E_1<(V-0.2)/4$$

$$E_2=V-2E_1 \text{ if } E_1\geq(V-0.2)/4$$

The operation of the second stage in FIG. 5 is also described by the foregoing analysis but the input of the second stage being the "folded" output voltage of the first stage, its output voltage, $E_4$, is twice folded.

It is to be noted that each transistor, whatever its type of conductivity, PNP or NPN, is followed by a transistor of opposite type, NPN or PNP, unless, as in FIG. 5 in going from transistor 59 to transistor 76, there is an inversion of signal and supply voltage polarities.

In addition, except at the polarity inversion between transistors 59 and 76, it is the collector of any transistor which is connected to the base of the succeeding transistor and the emitter of the transistor is connected to the series circuit which includes the emitter to collector circuit of the succeeding transistor at a point in that side of said series circuit which is connected to the collector of said succeeding transistor. Thus in FIGS. 1, 3, and 5 the final transistor has its emitter to collector circuit connected in a series circuit which terminates in terminal points which are connected across the source. In each case, the transistor ahead of the final transistor has its collector connected to the base of the final transistor and its emitter connected to a point in said series circuit on the collector side of the final transistor.

*FIGURE 7*

The folding circuits hereinbefore described are employed to special advantage in systems for sensing the state of a variable condition and the invention provides improved systems of this type. Such systems employ transducer means for providing a unidirectional voltage whose magnitude is indicative of the state of the condition such that, as the state of the condition varies over a range of states, the unidirectional voltage increases in magnitude through a selected range of voltages. Means are provided for applying this voltage to the input terminals of a folding circuit as herein defined which responds to the input voltage to produce a folded voltage. That is, as the unidirectional voltage increases over a first portion of its range (corresponding to changes in state over a portion of the range of states) up to a predetermined value, the folding circuit provides a correspondingly varying output signal. Then as the unidirectional voltage increases in magnitude (corresponding to further change in states of the condition) the folding circuit provides a signal which decreases in proportion to further increase in input signal voltage magnitude. Means are provided for determining whether the magnitude of the folding circuit output voltage is indicative of a state (and transducer output voltage magnitude) in said first position or a subsequent portion of its range.

Figure 7:
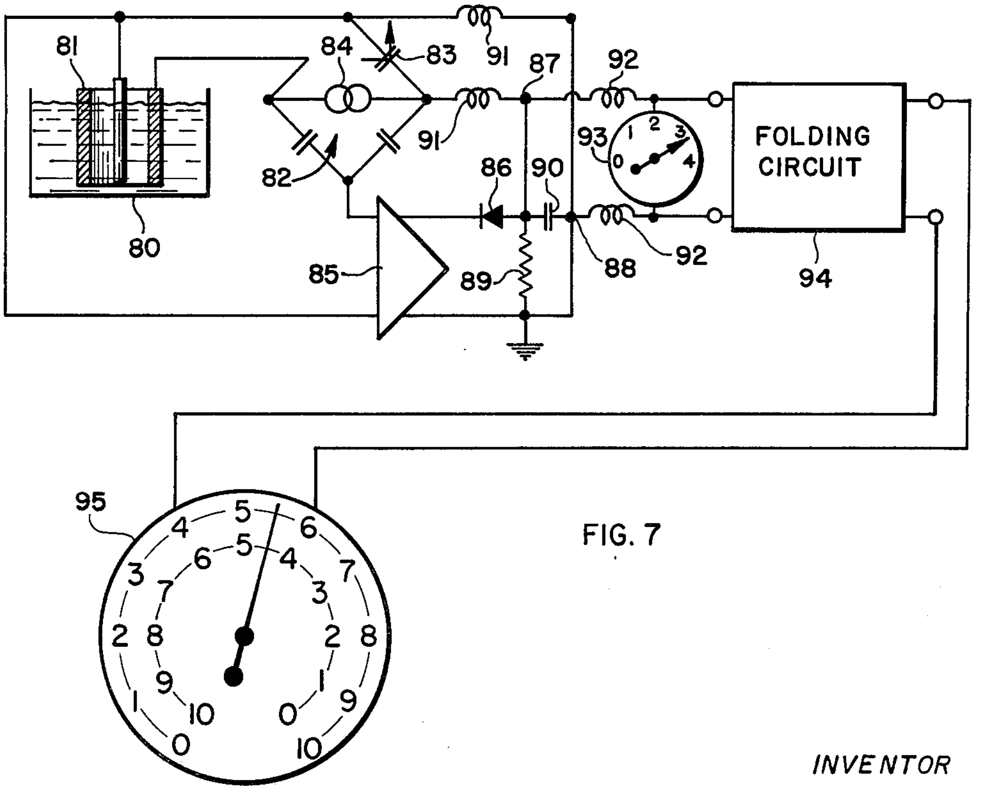
FIG. 7 is a partly diagrammatic and partly schematic representation of a condition sensing system embodying the invention.

Such a system is illustrated in FIG. 7. Its purpose in this example is to provide an indication of the level of the liquid in container 80. A capacitance probe 81 of conventional kind extends over the length of the container and is formed such that fluid enters between the capacitive probe elements to its level in the container. The fluid having a different dielectric constant than the atmosphere above, the probe exhibits electrical capacitance in a degree variable with liquid level. The probe is connected in one leg of a capacitance bridge 82, containing a semiconductor diode 83 in an adjacent leg, and energized across one diagonal by an alternating electrical source 84. The bridge balance condition signal appearing across the opposite diagonal is applied to an amplifier 85 whose output in view of the inclusion in series of a diode rectifier 86, is a unidirectional voltage appearing across junction points 87 and 88. It is filtered by a resistor 89-capacitor 90 combination connected in parallel across the output circuit.

The unidirectional voltage across points 87–88 is applied through radio frequency chokes 91 across the semiconductor junction diode whereby the capacitance exhibited across the diode junction is altered as a function of the magnitude of the unidirectional voltage and the bridge is rebalanced as explained by conventional feedback circuit theory. The portion of the system thus described is a transducer and the voltage across points 87 and 88 will vary with the level of the liquid in vessel 80 such that its magnitude is a measure of level. This voltage is also applied, through radio frequency chokes 92, across a voltmeter 93 and across the input terminals of a folding circuit 94, which may and here does comprise the circuit of FIG. 5.

In the embodiment selected for illustration it has been assumed that variations of four meters in level in tank 80 are to be indicated. Accordingly, voltmeter 93 is calibrated in meters of level above zero level and is chosen such that the change in unidirectional output voltage of the transducer will cause the meter needle to indicate zero at zero level and 4 meters when the level is four meters. The components of the folding circuit are selected to provide two "folds" over this same change in transducer output voltage.

The folded output voltage of the folding circuit 94 is applied to a voltmeter whose sensitivity is four times that of meter 93. Voltmeter 94 is advantageously provided with two scales, one clockwise and the other counter clockwise, both marked in units representing tenths of a meter of liquid level. When liquid level changes from zero to one meter, the needle of meter 93 is moved from zero to the one meter mark at one-fourth full scale movement. Simultaneously, the needle of meter 95 has moved from zero to full scale or 10 tenths of a meter on the clockwise scale.

As level is increased from one to two and then to three meters, the needle of meter 93 is moved to the 3 meter mark at full scale. Simultaneously the needle of meter 95 moves full scale back to zero at two meters and full scale to 10 tenths on the clockwise scale. In the drawing the liquid is shown to have a level between 3 and 4 meters and this is indicated by the needle of meter 93 which has moved to a point between 3 and 4 meter marks. As the level increased above 3, the needle of meter moved from the 10 tenths mark on the clockwise scale, or the zero tenths mark on the counter-clockwise scale, to a point half way between the 4 and 5 tenths mark on the counter clockwise scale. Meter 93 indicated which portion of the level range is being indicated by meter 95. Together they indicate a level of approximately 3.45 meters. The inclusion of the folding circuit permits the use of an indicating means which is four times as sensitive to level as meter 93 whereby a change in level can be determined with four times the accuracy possible by measuring the transducer output directly. The accuracy with which the state of the condition, here liquid level, can be increased many fold by addition of more folding circuits. It is essential to accuracy however that the gain of the folding circuit be constant and that the transistor point from amplifier to folder operation be sharp (i.e. gain constant in the vicinity of the transition voltage). These qualities are provided by the invention.

I claim:

1. An electrical circuit comprising:

(a) a pair of terminal points for connection across a unidirectional electrical power source;

(b) first, second, third, and fourth transistors, the first and third being of one type of conductivity and the second and fourth being of opposite type of conductivity;

(c) an input circuit extending from one of said terminal points to the other of said terminal points and including a connection to the base of said first transistor and input terminals for connection to an electrical source polarized to render said first transistor conductive;

(d) first and second resistors, (e) an output circuit comprising the emitter to collector circuit of said fourth transistor, said first resistor connected on the emitter side of said output circuit intermediate said emitter and said one terminal point and said second resistor connected on the collector side of said output circuit intermediate said collector and the other of said terminal points;

(f) said first, second, and third transistors having their collectors connected to the bases of said second, third, and fourth transistors, respectively, the emitter of said second transistor being connected to said one terminal point, and the emitter of said first and third transistors each being connected to a point in said collector side of said output circuit.

2. The invention defined in claim 1 including a diode in said input circuit intermediate said connection to the base of said first transistor and said input terminals and polarized to oppose flow of curent from said terminals to said base.

3. An electrical circuit comprising:

(a) a pair of terminal points for connection across a unidirectional electrical power source;

(b) first, second, third, and fourth transistors, the first and third being of one type of conductivity and the second and fourth being of opposite type of conductivity;

(c) an input circuit extending from one of said terminal points to the other of said terminal points and including a connection to the base of said first transistor and input terminals for connection to an electrical source polarized to render said first transistor conductive;

(d) first, second and third resistors;

(e) an output circuit comprising the emitter to collector circuit of said fourth transistor, said first resistor connected on the emitter side of said output circuit intermediate said emitter and said one terminal point and said second and third resistors connected on the collector side of said output circuit in series intermediate said collector and the other of said terminal points;

(f) said first, second, and third transistors having their collectors connected to the bases of said second, third, and fourth transistors, respectively, the emitter of said second transistor being connected to said one terminal point, and the emitter of said first transistor being connected to a point in said collector side of said output circuit between the second and third resistors.

References Cited by the Examiner

UNITED STATES PATENTS

| | | | |
|---|---|---|---|
| 2,892,044 | 6/59 | Fairstein | 179—171 |
| 2,945,188 | 7/60 | Lancaster | 330—24 |
| 3,008,091 | 11/61 | Van Overbeek et al. | 330—17 |
| 3,037,129 | 5/62 | Le Bel | 307—88.5 |
| 3,061,796 | 10/62 | Schoninger | 330—17 X |
| 3,073,160 | 1/63 | Shawhan | 73—304 |
| 3,076,135 | 1/63 | Farnsworth et al. | 307—88.5 X |
| 3,076,901 | 2/63 | Rubin et al. | 307—88.5 |
| 3,079,793 | 3/63 | Hermanson | 73—304 |
| 3,095,512 | 6/63 | Little | 307—88.5 |

FOREIGN PATENTS

| | | |
|---|---|---|
| 868,381 | 5/61 | Great Britain. |

ARTHUR GAUSS, *Primary Examiner.*